United States Patent
Andhavarapu et al.

(10) Patent No.: US 11,086,943 B2
(45) Date of Patent: Aug. 10, 2021

(54) BUCKET BASED DISTRIBUTED SEARCH SYSTEM

(71) Applicant: eBay Inc., San Jose, CA (US)

(72) Inventors: Abhishek Andhavarapu, San Jose, CA (US); Senthilnathan Subramanian, San Jose, CA (US)

(73) Assignee: eBay Inc., San Jose, CA (US)

(*) Notice: Subject to any disclaimer, the term of this patent is extended or adjusted under 35 U.S.C. 154(b) by 263 days.

(21) Appl. No.: 15/651,793

(22) Filed: Jul. 17, 2017

(65) Prior Publication Data

US 2019/0018896 A1    Jan. 17, 2019

(51) Int. Cl.
| | |
|---|---|
| *G06F 16/951* | (2019.01) |
| *G06F 11/14* | (2006.01) |
| *G06F 16/22* | (2019.01) |
| *G06F 16/23* | (2019.01) |
| *G06F 16/31* | (2019.01) |
| *G06F 16/901* | (2019.01) |

(52) U.S. Cl.
CPC ........ *G06F 16/951* (2019.01); *G06F 11/1464* (2013.01); *G06F 16/2228* (2019.01); *G06F 16/2379* (2019.01); *G06F 16/316* (2019.01); *G06F 16/901* (2019.01); *G06F 2201/84* (2013.01)

(58) Field of Classification Search
CPC ........ G06F 17/30864; G06F 17/30321; G06F 17/30377; G06F 11/1464; G06F 16/951; G06F 16/2228; G06F 16/2379; G06F 16/316; G06F 16/901; G06F 2201/84
USPC ........................................................ 707/652
See application file for complete search history.

(56) References Cited

U.S. PATENT DOCUMENTS

| | | | | |
|---|---|---|---|---|
| 6,308,172 | B1 * | 10/2001 | Agrawal | .................. C06F 3/04 |
| 6,757,753 | B1 * | 6/2004 | DeKoning | ............ G06F 3/0605 |
| | | | | 710/36 |
| 7,685,109 | B1 | 3/2010 | Ransil et al. | |
| 2011/0196855 | A1 * | 8/2011 | Wable | ............... G06F 16/24554 |
| | | | | 707/711 |
| 2011/0218999 | A1 * | 9/2011 | Kan | ...................... G06F 16/217 |
| | | | | 707/737 |
| 2012/0324089 | A1 * | 12/2012 | Joshi | ................. H04L 29/12933 |
| | | | | 709/223 |

(Continued)

FOREIGN PATENT DOCUMENTS

| | | | | |
|---|---|---|---|---|
| WO | WO-2016118876 A1 * | 7/2016 | ......... | H04L 65/4076 |
| WO | 2019/018192 A1 | 1/2019 | | |

OTHER PUBLICATIONS hello@timescale.com, "TimescaleDB: SQL made scalable for time-series data", Apr. 7, 2017 (Year: 2017).*

(Continued)

*Primary Examiner* — Hosain T Alam
*Assistant Examiner* — Robert F May
(74) *Attorney, Agent, or Firm* — FIG. 1 Patents

(57) ABSTRACT

A distributed search system can be partitioned into buckets based on entities and time periods. Addresses for the partitions can be formed from entity parameters and time period parameters. An indexing scheme for the partitions can be maintained at one or more search clusters, which may be geographically separate from one another. Consistency can be maintained across the search clusters though routing queries between clusters based at least in part on the status of partitions.

20 Claims, 9 Drawing Sheets

(56) References Cited

U.S. PATENT DOCUMENTS

2017/0139961 A1\* 5/2017 Baum ............... G06F 16/24568
2017/0193040 A1\* 7/2017 Agrawal ............... G06F 16/245

OTHER PUBLICATIONS

"International Application Serial No. PCT US2018 041765, International Search Report dated Sep. 5, 2018", 4 pgs.

"International Application Serial No. PCT US2018 041765, Written Opinion dated Sep. 5, 2018", 6 pgs.

Abigail, "Elasticsearch Across Multiple Data Center Architecture Design Options", Retrieved from Internet: URL: https: discuss.elastic.co t elasticsearch-across-multiple-data-center-architecture-design-options 22605 2, (Mar. 2015), pp. 1-10.

Gies, "Scaling Elasticsearch Across Data Centers With Kafka", Retrieved from Internet: URL: https: www.elastic.co blog scaling_elasticsearch_across_data_centers_with_kafka, (Dec. 1, 2015), 9 pages.

Kraska, "MDCC: Multi-Data Center Consistency", Retrieved from Internet: URL: http: mdcc.cs.berkeley.edu , (2013), 3 pages.

International Preliminary Report on Patentability received for PCT Application No. PCT/US2018/041765, dated Jan. 30, 2020, 8 pages.

\* cited by examiner

BUCKET BASED DISTRIBUTED SEARCH SYSTEM

TECHNICAL FIELD

Embodiments of the present disclosure relate generally to search engines and, more particularly, but not by way of limitation, to bucket based search systems.

BACKGROUND

To maintain reliability and consistency in database management systems, a primary data store is implemented to handle writes. Further a standby data store may receive the writes written to the primary data store asynchronously. In case the primary data store fails, the standby data store may take over for the primary data store. Reading from multiple data stores at different geographic locations creates consistency problems across the datacenters. Operating from multiple datacenters is one of the most challenging problems in computing.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A multi-datacenter search system can implement both a relational database and a distributed search system to provide database operations for a network site, such as a website. Data can initially be published to a relational database. For faster retrieval, the data can further be stored in a distributed search system, such as ElasticSearch®. The distributed search system may operate one or more clusters that can use an indexing scheme to index partitions. In some example embodiments, the website is used by some users to publish data (e.g., item listings) and other users to query the published data. The indexing scheme can bucket sets of partitions by the user's that published the data, according to some example embodiments. Each set of partitions can be further divided according to periods of times (e.g., by months, other units of sequential periods of time). Each monthly partition of a given user's partition set can be addressed using a combination of characters from the user's identification (ID) and the month. For example, B1M1 specifies the bucket for the first user (e.g., B1 identifies the first user, where 1 may be the user's ID) and within that bucket, the first month (e.g., M1=January). Applying the user/time indexing scheme allows the search system to perform very fast responses to user queries.

Further, the indexing scheme allows scalability across multiple datacenters and consistency across those datacenters. In some example embodiments, if a partition of a given datacenter is non-functional (e.g., due to a backlog or down node), then queries can be routed to other datacenters while queries not directed to the non-functioning node are still serviced by the given datacenter.

Figure 1:
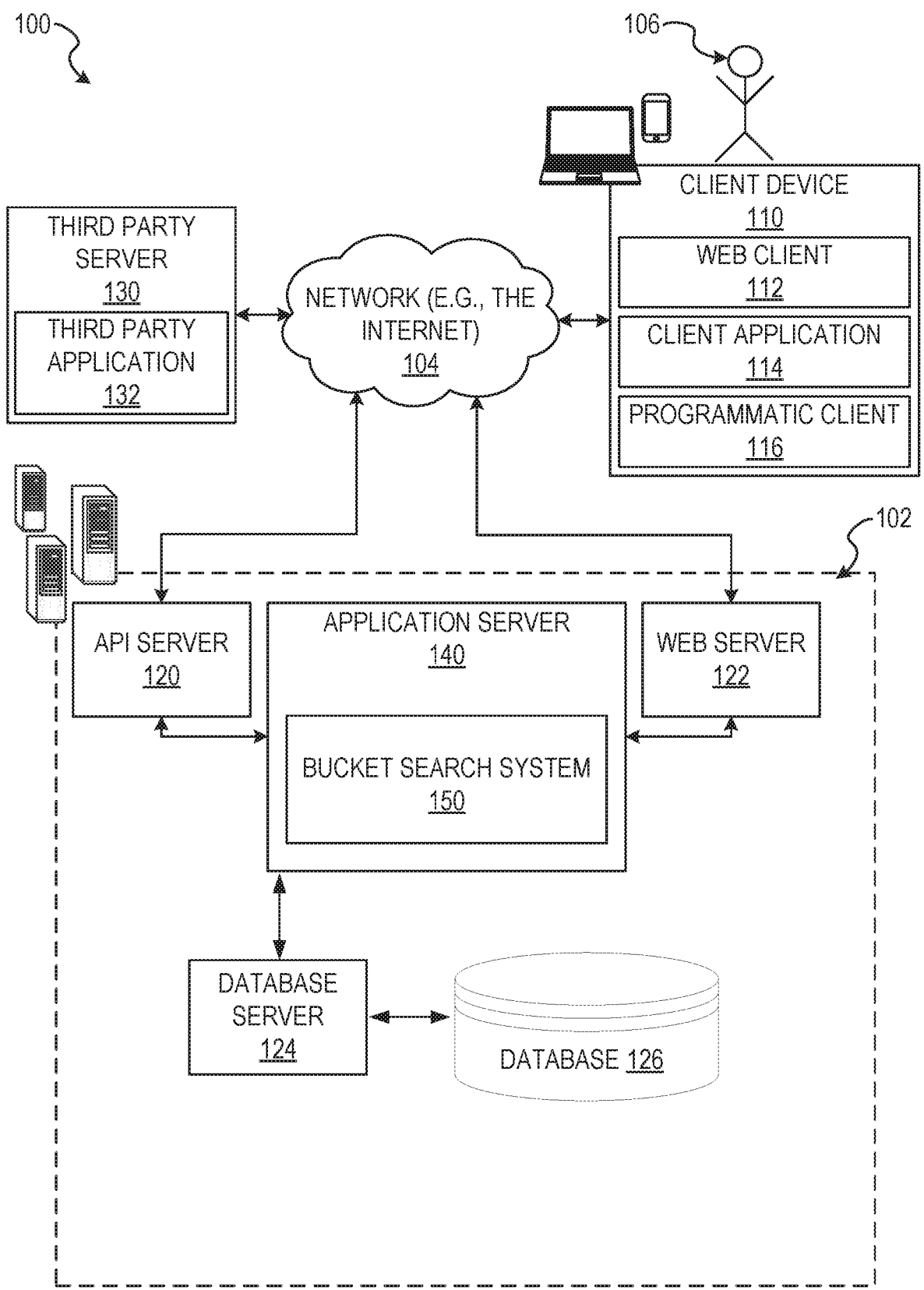
FIG. 1 is a block diagram illustrating a networked system, according to some example embodiments.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. In some implementations, a user (e.g., user 106) interacts with the networked system 102 using the client device 110. FIG. 1 illustrates, for example, a web client 112 (e.g., a browser), applications 114, and a programmatic client 116 executing on the client device 110. The client device 110 includes the web client 112, the client application 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a WAN, a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

In some example embodiments, the client device 110 includes one or more applications (also referred to as "apps") such as, but not limited to, web browsers, book reader apps (operable to read e-books), media apps (operable to present various media forms including audio and video), fitness apps, biometric monitoring apps, messaging apps, and electronic mail (email) apps. In some implementations, the client application 114 include various components operable to present information to the user and communicate with networked system 102.

The web client 112 accesses the various systems of the networked system 102 via the web interface supported by a web server 122. In some example embodiments, the web server 122 hosts a public facing website (e.g., accessible to user 106 using his/her client device 110 through the network 104). The website is configured to publish items listings and receive queries for the published item listings. The programmatic client 116 and client application 114 access the various services and functions provided by the networked system 102 via the programmatic interface provided by an Application Program Interface (API) server 120.

Users (e.g., the user 106) comprise a person, a machine, or other means of interacting with the client device 110. In some example embodiments, the user is not part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The API server 120 and the web server 122 are coupled to, and provide programmatic and web interfaces respectively to, one or more application servers 140. The application server 140 can host a bucket search system 150, which can comprise one or more modules or applications, each of which can be embodied as hardware, firmware, or combinations thereof. The application server 140 is, in turn, shown to be coupled to a database server 124 that facilitates access to one or more information storage repositories, such as database 126. In an example embodiment, the database 126 comprises one or more storage devices that store information to be accessed by bucket search system 150 or client device 110. Additionally, a third party application 132, executing on third party server 130, is shown as having programmatic access to the networked system 102 via the programmatic interface provided by the API server 120. For example, the third party application 132, utilizing information retrieved from the networked system 102, supports one or more features or functions on a website hosted by the third party.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server 140 (e.g., the bucket search system 150) can also be implemented as standalone software programs, which do not necessarily have networking capabilities.

Figure 2:
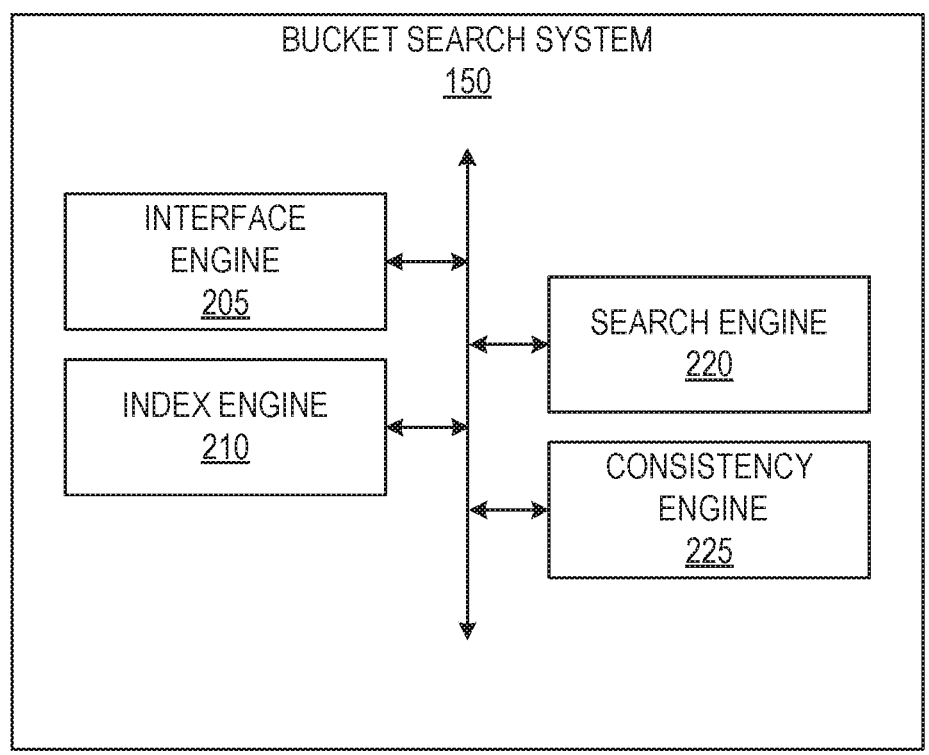
FIG. 2 is a block diagram showing example components provided within the bucket search system of FIG. 1, according to some example embodiments.

FIG. 2 illustrates a block diagram showing functional engines provided within the bucket search system 150, according to some embodiments. As illustrated, the bucket search system 150 comprises an interface engine 205, an index engine 210, a search engine 220, and a consistency engine 225. The components themselves are communicatively coupled (e.g., via appropriate interfaces) to each other and to various data sources so as to allow information to be passed between the applications or so as to allow the applications to share and access common data. Furthermore, the components access the database 126 via the database server 124.

The interface engine 205 is configured to receive write requests (create/read/update/delete (CRUD) operations) from users and interface with the database server 124 to store the query data to the database 126 (e.g., a relational database. The index engine 210 is configured to create an index that the search engine 220 can use to quickly find results.

The search engine 220 is configured to receive queries and use the index generated by the index engine 210 to retrieve search results. In some example embodiments, the search engine is implemented as a distributed search engine using different search clusters (e.g., ElasticSearch, a distributed search system built from Apache Lucene). Each cluster comprises a plurality of nodes. Each node comprises a plurality of shards. Each shard comprises a plurality of segments that make up an inverted index. A shard is generally in itself a fully-functional and independent "index" that can be hosted on any node in the cluster. Shards in different nodes can be indexed into partitions to enable high-speed parallel access to the shards to return results for queries. The indexing scheme used to organize shards (e.g., partitions) can be organized in different ways. The way (e.g., scheme) a given index is implemented can have a large effect on how fast the search engine can retrieve results and also limit a search engine's ability to scale.

The consistency engine 225 is configured to manage consistency across search engine clusters, which may be located in different datacenters at different geographic locations.

Figure 3:
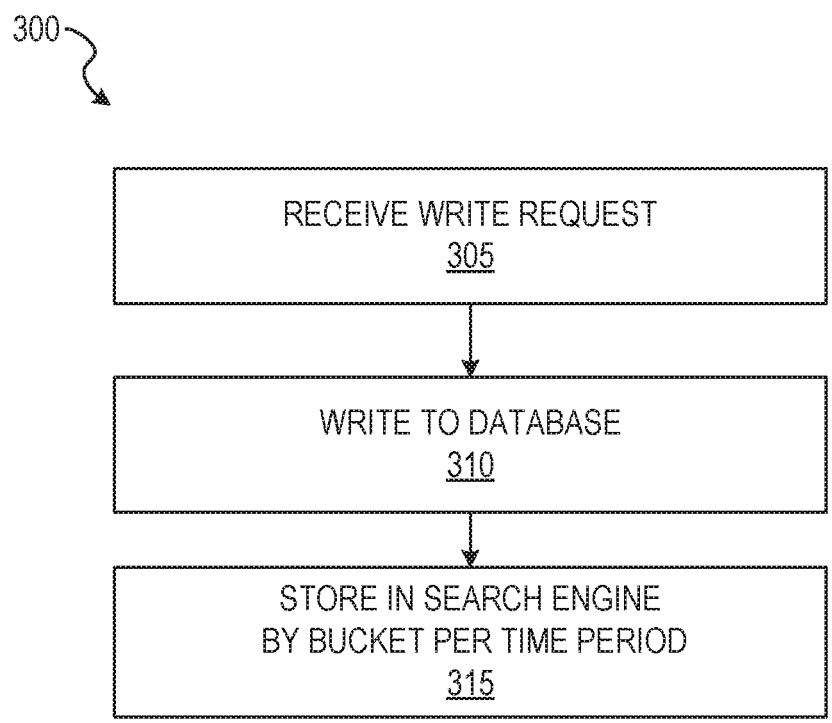
FIG. 3 shows a flow diagram of a method for indexing data in a distributed search system, according to some example embodiments.

FIG. 3 shows a flow diagram of a method 300 for indexing data in a distributed search system, according to some example embodiments. At operation 305, the interface engine 205 receives a write request. The write request may be in response to a listing published on a network site. For example, a user can create an item listing and publish it to a website. The data from the listing (e.g., title, item description, etc.) can be included in the write request. The request is an instruction to write the listing data to a data store, such as a relational database, for later access. At operation 310, the interface engine 205 directs the write request to a relational database (e.g., SQL based database) for storage.

While the relational database (e.g., database 126) may be used to retrieve results for a given items listing search (e.g., a user searching for "iPhone" listings on an auction site), relational database are not as fast as some distributed search engines (e.g., ElasticSearch). Accordingly, to increase search speed, at operation 315, the index engine 210 stores the write request data (e.g., listing data) in a search engine system. In some example embodiments, the write request data is stored in the search engine system by generating documents with fields for the write request data, then indexing the documents in the distributed search system for later quick retrieval. In some example embodiments, the indexing scheme implemented creates sets of partitions (e.g., buckets) for each user. Within each user bucket, the partitions are further sub-divided into time periods, such as months. Examples of bucketing per user per time period is discussed in further detail below, with reference to FIG. 5 and FIG. 6.

Figure 4:
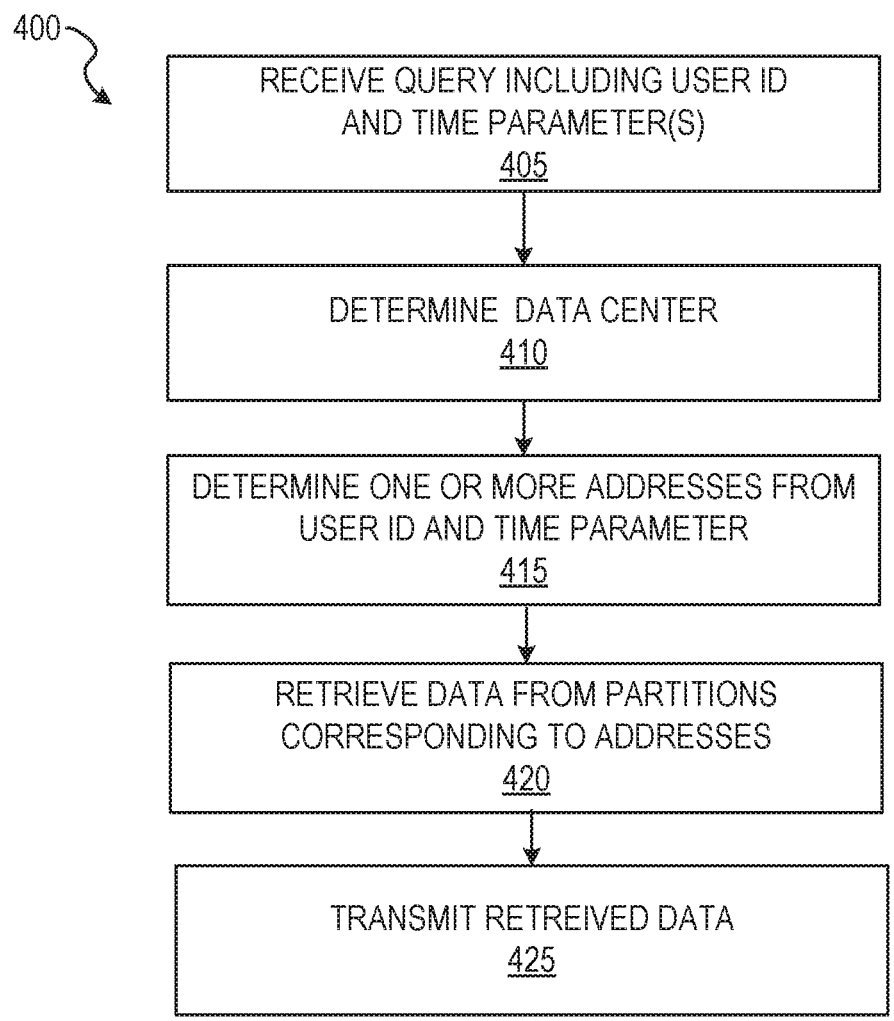
FIG. 4 shows a flow diagram of an example method for retrieving data for a given query using a user and time based bucketing approach, according to some example embodiments.

FIG. 4 shows flow diagram of an example method 400 for retrieving data for a given query using a user and time based bucketing approach, according to some example embodiments. At operation 405, the search engine 220 receives a query. The query may be a search request requesting all given listings from a certain user for a given set of months. For example, the search request may request all listings published by the user 1234567 from January to February of 2017. The query thus may include a user ID (1234567) and time parameters (the first and second months of the year).

At operation 410, the search engine 220 determines a datacenter to fulfill the search. In some example embodiments, a plurality of datacenters located at different geographic locations are used to service queries. The search engine 220 may automatically determine that a given datacenter should be used to service the query because the given datacenter is geographically closest to the user (e.g., closest to the server that received the query from a client device of the user).

At operation 415, the search engine 220 may determine an address (e.g., index) using the user ID and the time parameters from the query. For example, the search engine may take the mod of the user ID 1234567 to get "7", thereby determining that the 7th bucket "B7" (e.g., set of partitions) corresponds to that user. In some example embodiments, different portions of the user ID is a bucket identifier. For example, the last five digits of a user ID can identify which bucket corresponds to the user.

Further, the search engine 220 uses the time parameters M1, which corresponds to January, and M2, which corresponds to February. The search engine 220 then concatenates the bucket ID (from the user ID) with the time parameters to form the addresses. For example, the search engine 220 combines B7 with M1 to form the index B7M1, which is the address for the partition (e.g., shards of documents) at that location which contains data from listings posted by the user 1234567 during January. Likewise, the search engine 220 combines B7 with M2 to form the index B7M2, which is the address for the partition (e.g., shards of documents) at that location which contains data from listings posted by the user 1234567 during January.

At operation 420, the search engine 220 retrieves the listing data using the addresses. For example, the search engine 220 retrieves the data stored at B7M1 and B7M2. At operation 425, the search engine 220 transmits the data retrieved to the client device that submitted the query.

Figure 5:
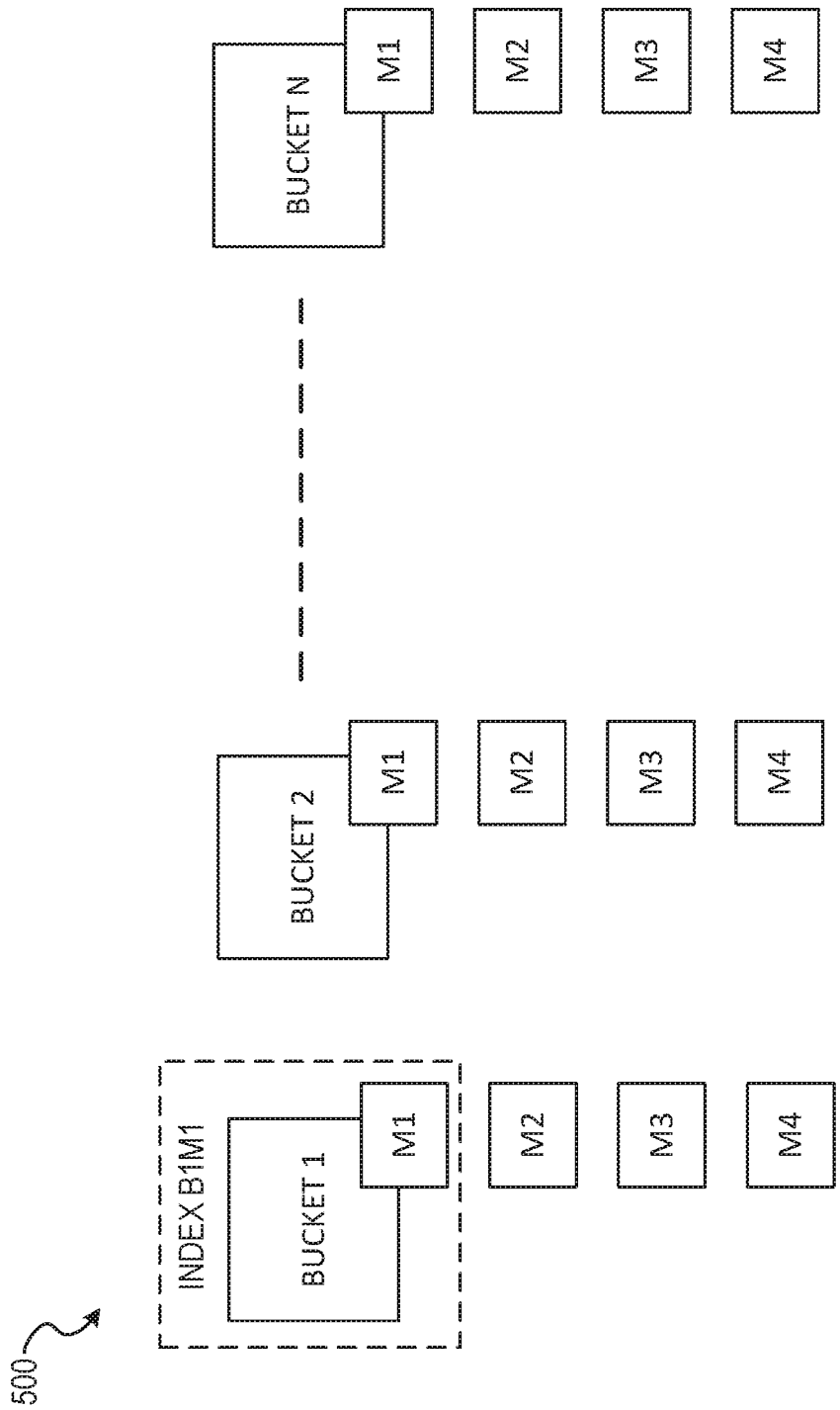
FIG. 5 shows architecture of the indexes, according to some example embodiments.

FIG. 5 shows architecture 500 (e.g., a logical architecture) of the indexes, according to some example embodiments. As illustrated, the architecture comprises a number of buckets including bucket 1 for a first user, bucket 2 for a second user, to bucket N for the Nth user. Each bucket is further sub-divided into time periods. For example, bucket 1 further includes M1 for the month of January, M2 for the month of February, M3 for the month of March, M4 for the month of April, and so on. The other buckets are similarly sub-divided into time periods (e.g. bucket 2 having M1, M2, etc.). A given index may be addressed using a bucket/time-period based address. Thus, as illustrated by the dotted line box in FIG. 5, the index address "B1M1" contains data for the first user "B1" (of bucket 1) for the first month "M1" (e.g., listings published during the first month).

The indexing scheme of architecture 500 is optimized for network sites that service a plurality of users that submit items of content for publication (e.g., sellers posting iPhone listings), which are queried for by other users (e.g., buyers searching for iPhone listings). Other examples of users for which architecture 500 may be implemented include social network systems in which some users publish posts and other users view the posts. For example, a user can log into his/her social network website profile and his/her timeline may be auto-populated by retrieving data from period partitions of other user buckets.

Figure 6:
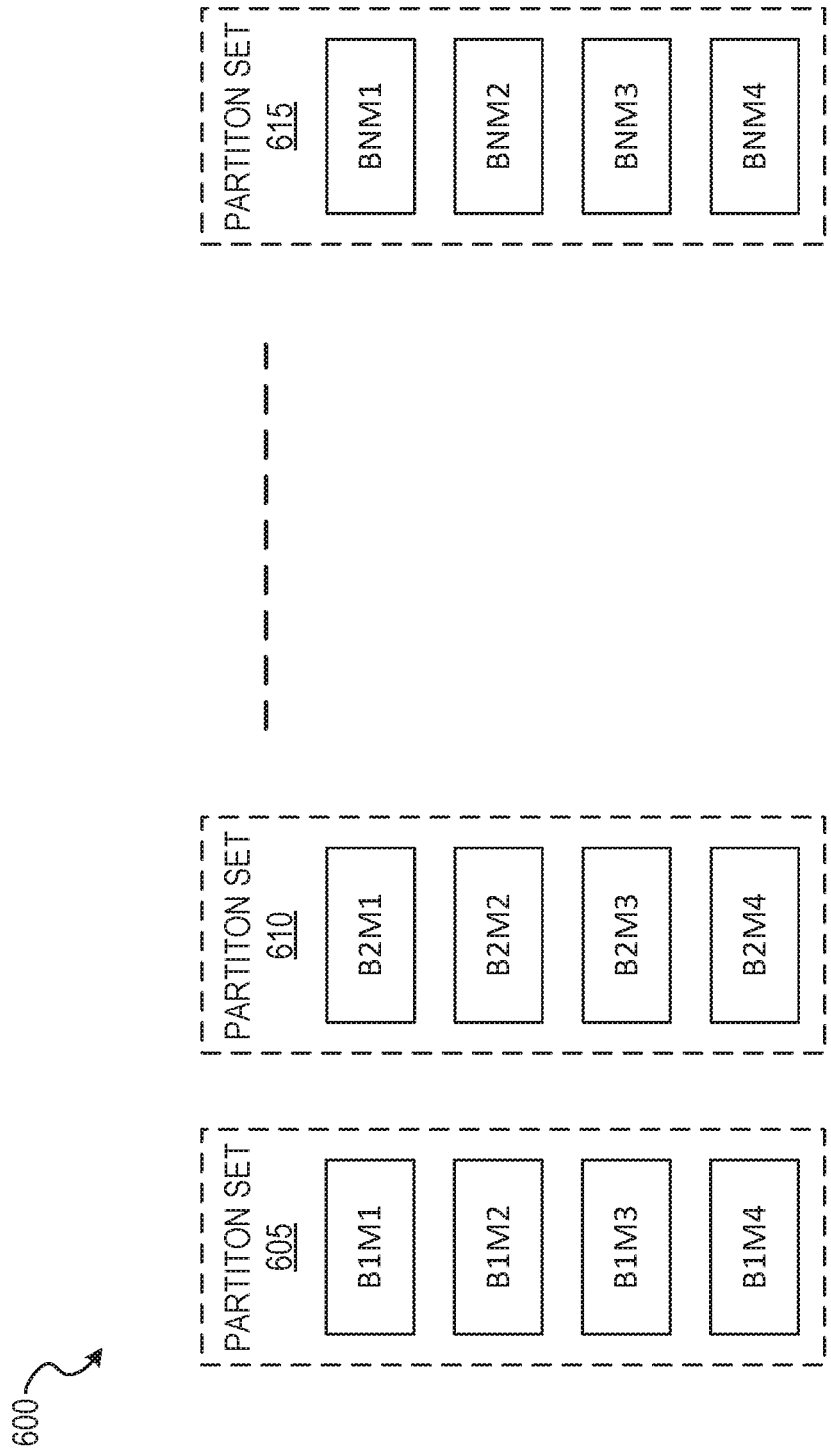
FIG. 6 shows an architecture of the indexes, according to some example embodiments.

FIG. 6 shows architecture 600 (e.g., a logical architecture) of the indexes, according to some example embodiments. In architecture 600, each index is listed with its address. As illustrated, a first partition set 605 stores partitions of the first bucket, comprising B1M1, B1M2, B1M3, and B1M4. Similarly, a second partition set 610 stores partitions of the second bucket, comprising B2M1, B2M2, B2M3, and B2M4. An Nth partition set 615 stores partitions of the Nth bucket, comprising BNM1, BNM2, BNM3, and BNM4. In some example embodiments, the partitions correspond to shards, which may be stored on different nodes for faster parallel access. For example, B1M1 may be stored on a first node of a search cluster, B1M2 may be stored on a second node of the same search cluster, and so on. Thus, executing a query on B1M1 and B1M2 can be performed in parallel on the different nodes of the same search cluster.

A further advantage of the indexing scheme illustrated in FIG. 5 or FIG. 6 is that it can scale across multiple datacenters while maintaining consistency of the data stored in different datacenters. For example, three different datacenters may each have a search cluster that has the same data and index. When a write request is received, it is index and stored in all three search clusters in parallel.

In some example embodiments, such as an enterprise setting, the number of queries to be written to partitions is so large that a backlog may occur on one or more partitions. Partitions that have a backlog may not have the most up-to-data for a given query. In those example embodiments, the partition that has a backlog is flagged as non-functional. In some cases, multiple partitions may be non-functional and marked as such due to other problems such a node going down (e.g., prematurely terminating) or coding errors.

Queries directed to the non-functional partitions (within a given datacenter) may be routed to the same partition at a different datacenter, while queries directed to other still functioning partitions may still be serviced at that datacenter (e.g., the original datacenter that received the query). For example, with reference to FIG. 6, assume B2M2 has a backlog of 100 writes, and is thus marked non-functional. Queries directed to B2M2 in a given search cluster are automatically routed to B2M2 at a different datacenter. At the same time, queries directed to B2M1, B2M3, and B2M4 are still functioning and may be serviced at the original datacenter. In this way, most users of the datacenter will experience no delay while users directing queries towards the non-functioning partitions will experience more delay as the queries are routed to the other datacenter for servicing. In some example embodiments, all search clusters may go down or a given partition on all three clusters may go down.

In those example embodiments, the queries can still be serviced by routing the queries to the relational database (e.g., SQL based database).

Figure 7:
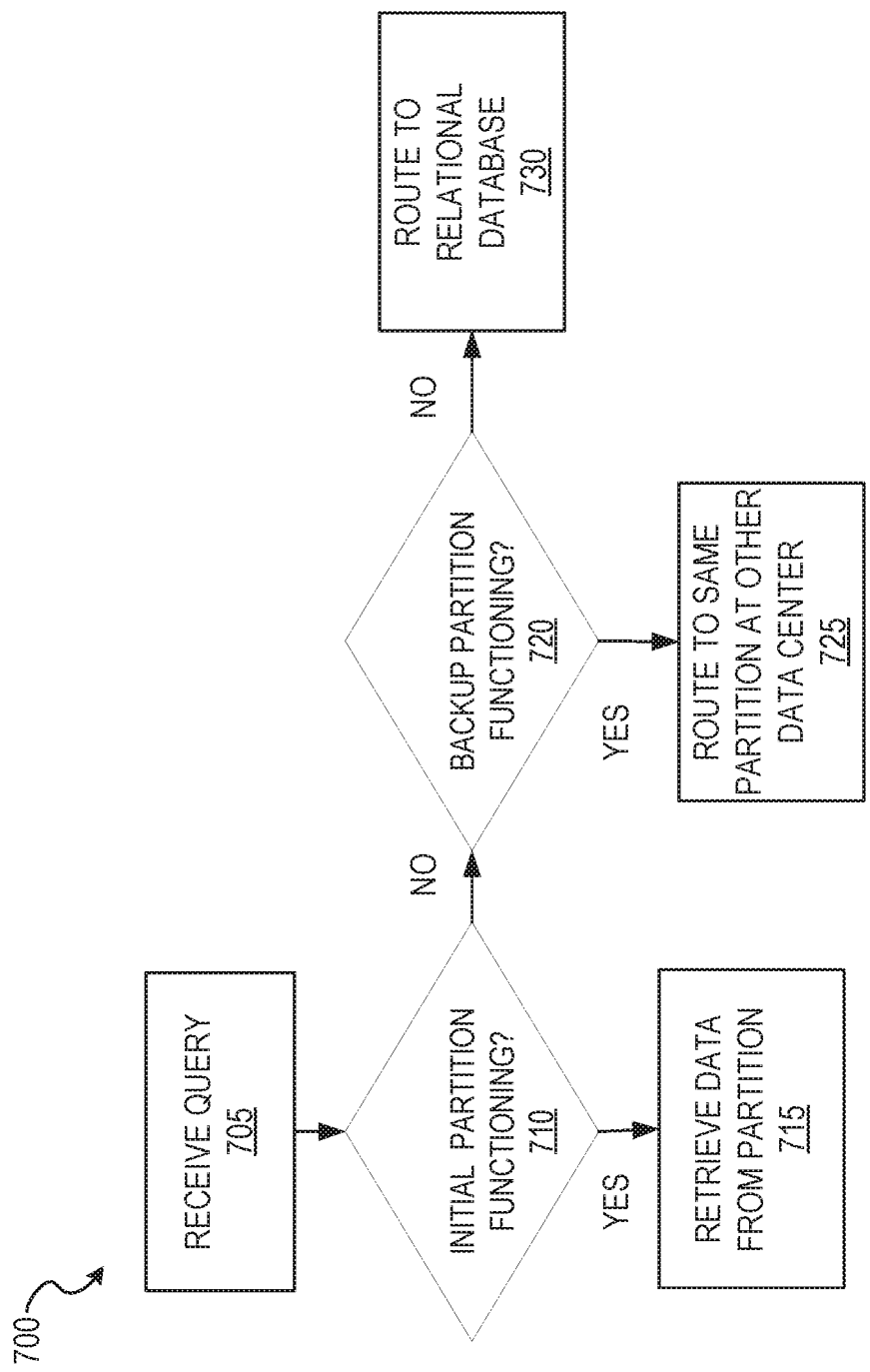
FIG. 7 shows a flow diagram of a method for maintaining consistency across search clusters in different geographically separate datacenters, according to some example embodiments.

FIG. 7 shows a flow diagram of a method 700 for maintaining reliability across search clusters in different geographically separate datacenters, according to some example embodiments. At operation 705, the interface engine 205 receives a query for data. At operation 710, the search engine 220 checks whether an initial partition of a given datacenter (e.g., closest or fastest data center) is functioning. For example, the consistency engine 225 may check a look-up table stored in a relational database that tracks the status of the different partitions (e.g., whether the partitions have a backlog, or are otherwise non-functioning). If the required partitions are functioning at the given datacenter, then the search engine 220 retrieves the data from the addressed partition at operation 715. In some example embodiments, the data center that is first checked is the datacenter that first receives the query, or the data center closest to the network point in which the query was received. At operation 720, the consistency engine 225 checks whether the same partition at another datacenter (e.g., a backup partition) is functioning. If the partition is functioning, then the consistency engine 225 at the first datacenter passes the query to the consistency engine 225 installed at the second datacenter (e.g., in a second instance of bucket search system 150 executing at the second datacenter). The consistency engine 225 at the second datacenter then services the query at operation 725 and sends the results to the user that submitted the query. Assuming at operation 720 the backup partition is also non-functioning (e.g., due to a backlog or all search clusters going down), then the consistency engine 225 (at the initial datacenter) routes the query to the relational database at 730 for servicing.

In some example embodiments, a single consistency engine checks which of the data centers have a functioning partition that can service the query. The single consistency engine then routes the query to the data center that is closest to user or network entity that generated the query. Further details of a single consistency engine servicing multiple geographically different data centers is discussed below with reference to FIG. 8, according to some example embodiments.

Figure 8:
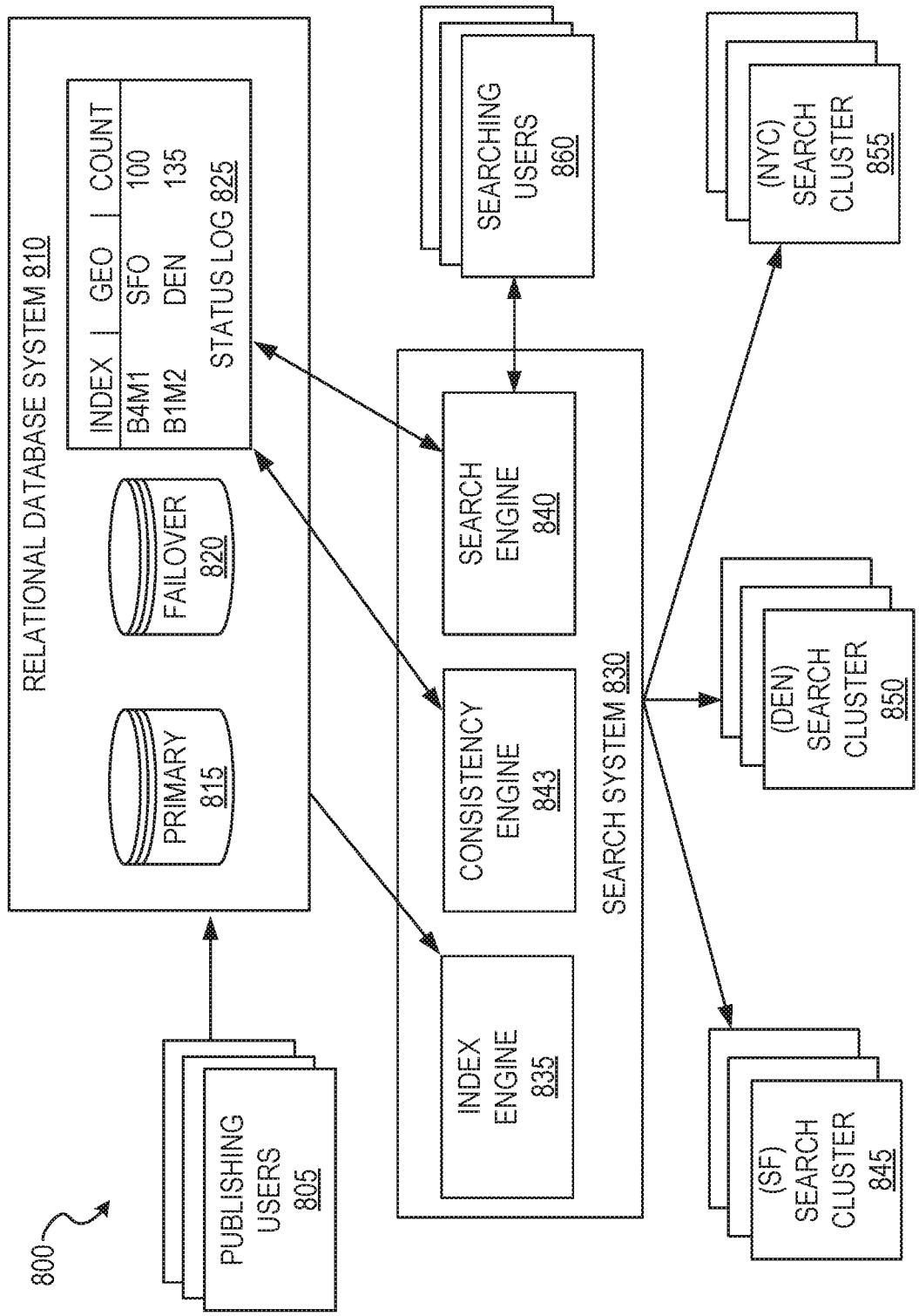
FIG. 8 shows an architecture of the bucket search system operating across different datacenters with a relational database as a backup, according to some example embodiments.

FIG. 8 shows an architecture 800 of the bucket search system 150 operating across different datacenters with a relational database as a backup, according to some example embodiments. As illustrated, publishing users 805 (e.g., sellers) submit listings to be published, which are initially stored within relational database 810. Relational database 810 may comprise a primary database 815 and failover database 820. Failover database 820 can service queries instead of the primary database 815 should the primary database 815 go down. After the listings (against which queries can be executed) are stored in the relational database 810, they are further indexed and stored within a search system 830, which comprises index engine 835 and search engine 840. Although the search system 830 is shown as receiving all queries from searching users 860 and managing all search clusters 845-855, in some example embodiments, separate instances of search system 830 are installed within each datacenter (each which houses one of the search clusters 845-855) and the separate instances work together as part of distributed architecture to service the queries. Other variations are possible, according to some example embodiments. For example, an index engine installed at a master datacenter may manage distribution of the index to the separate search clusters. Further, while a master datacenter manages the index, each datacenter may have its own instance of a search engine (e.g., search engine 840) and a consistency engine. When a query is received at any given datacenter, the search engine instance installed at the datacenter may service the query and/or work with the consistency engines of other datacenters to service queries in concert (as discussed above, with reference to FIG. 7.). Further, as illustrated in FIG. 8, a single search system 830 comprising a consistency engine and a search engine can handle searches across different search clusters 845-855 (e.g., execute a search on the search cluster having a functioning partition). Further, as illustrated in FIG. 8, one index engine 835 can service different search clusters (e.g., search clusters 845-855). The single index engine 835 writes documents (e.g., data items, elastic search documents) to all the search clusters. If the index engine 835 encounters an error writing to one of the search clusters, error information detailing the error location and error type are stored in the status log 825, according to some example embodiments.

The index engine 835 indexes the write request to a plurality of search clusters, such as search cluster 845 located in a San Francisco datacenter, search cluster 850 located at a Denver datacenter, and search cluster 855 located at a New York City search cluster. Each of the search clusters 845-855 may contain copies of the documents (e.g., listing data) and index structure, as discussed above with reference to FIG. 5 and FIG. 6. Searching users 860 (e.g., buyers) submit queries for the data published by the publishing users 805. The consistency engine 843 may receive the queries and check in a lookup table, such as status log 825, to determine whether a given partition required for a query is functional. The status log 825 is a table stored in the relational database 810 that tracks which partitions have backlogs or are otherwise non-functioning. As illustrated, according to some example embodiments, the status log 825 is a table data stored in a relational database. However, in some example embodiments, the status log 825 is stored in other types of databases (e.g., non-SQL databases, comma separated values stored in local memory of the client device, etc.) Assuming the consistency engine 843 have functioning partitions that can service the query, the query and identification of which partition to use is routed to the search engine 840. The search engine 840 can then execute the query using on the identified functioning cluster from the search clusters 845-855.

Further illustrated in search system 830 is consistency engine 843, according to some example embodiments. The consistency engine 843 can be configured to correct issues in the backlog. For example, the consistency engine 843 can be configured (e.g., programmed) to wake up every five minutes and check the status log to look for backlog type errors. Each failure to write to the index is a count in the status log 825. Thus, as illustrated in status log 825, FIG. 8, B4M1 has 100 non-performance errors (e.g., failed writes). For each non-performance error, the data to be written/updated and a time stamp of the time in which the error occurred is also stored in a separate table in relational database 810. When the consistency engine 843 wakes up (e.g., at the five minute interval), it checks the status log 825, and uses the time stamp and data to be written/updated for each error to correct each count in the backlog. If a cluster is completely down, the consistency engine 843 will keep retrying until it succeeds (e.g., fixes the errors and reduces the count to zero). Until the consistency engine 843 succeeds in fixing a given cluster or bucket, the cluster/buckets are not queried, thereby maintaining the consistency across the system.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with FIGS. 1-8 are implemented in some embodiments in the context of a machine and an associated software architecture. The sections below describe representative software architecture and machine (e.g., hardware) architecture that are suitable for use with the disclosed embodiments.

Figure 9:
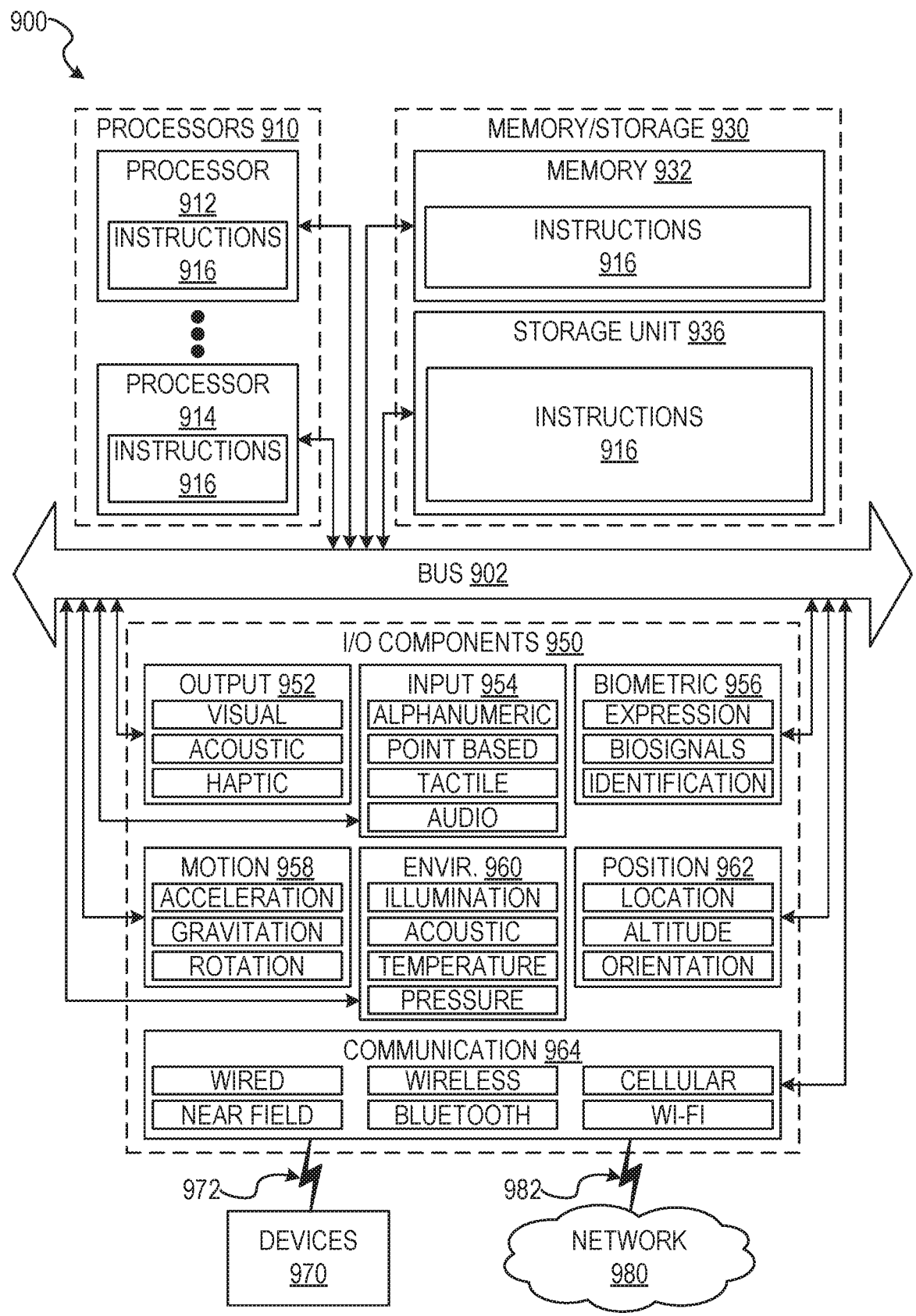
FIG. 9 illustrates a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein can be executed. For example, the instructions 916 can cause the machine 900 to execute the flow diagrams of FIGS. 3, 4, and 7. Additionally, or alternatively, the instruction 916 can implement the engines of FIG. 2, and so forth. The instructions 916 transform the general, non-programmed machine into a particular machine programmed to carry out the described and illustrated functions in the manner described. In alternative embodiments, the machine 900 operates as a standalone device or can be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 can include processors 910, memory/storage 930, and input/output (I/O) components 950, which can be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, processor 912 and processor 914 that may execute instructions 916. The term "processor" is intended to include multi-core processors that may comprise two or more independent processors (sometimes referred to as "cores") that can execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory/storage 930 can include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 can also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of the processors 910 are examples of machine-readable media.

As used herein, the term "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 can include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 can include many other components that are not shown in FIG. 9. The I/O components 950 are grouped according to functionality merely for simplifying the following discussion, and the grouping is in no way limiting. In various example embodiments, the I/O components 950 can include output components 952 and input components 954. The output components 952 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 950 can include biometric components 956, motion components 958, environmental components 960, or position components 962 among a wide array of other components. For example, the biometric components 956 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 can include acceleration sensor components (e.g., an accelerometer), gravitation sensor components, rotation sensor components (e.g., a gyroscope), and so forth. The environmental components 960 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 can include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or other suitable device to interface with the network 980. In further examples, communication components 964 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 970 may be another machine or any of a wide variety of peripheral devices (e.g., a peripheral device coupled via a Universal Serial Bus (USB)).

Moreover, the communication components 964 can detect identifiers or include components operable to detect identifiers. For example, the communication components 964 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2 dimensional (2D) bar codes, and other optical codes), acoustic detection components (e.g., microphones to identify tagged audio signals), or any suitable combination thereof. In addition, a variety of information can be derived via the communication components 964, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 980 can be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or other type of cellular or wireless coupling. In this example, the coupling 982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 916 can be transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, the instructions 916 can be transmitted or received using a transmission medium via the coupling 972 (e.g., a peer-to-peer coupling) to devices 970. The term "transmission medium" shall be taken to include any intangible medium that is capable of storing, encoding, or carrying the instructions 916 for execution by the machine 900, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
indexing, using one or more processors of a machine, a plurality of partition sets in an index of a search engine, each partition set corresponding to only a single particular user of a plurality of users of a network service, each partition in a particular partition set of the single particular user corresponding to one of a-plurality of periods of time in which data associated with the single particular user was generated using the network service;
receiving, from a client device, a query for a portion of the data, the query comprising a user identifier to identify the single particular user and one or more time parameters indicative of at least one period of time of the plurality of periods of time;
generating an address for at least one partition by concatenating the user identifier of the single particular user and the at least one period of time;
retrieving the portion of the data from the at least one partition that matches the generated address, the portion of the data including the data associated with the single particular user generated during the at least one period of time; and
providing the retrieved portion of the data to the client device.

2. The method of claim 1, wherein:
the plurality of partition sets and the index are stored at a first datacenter; and
the method further comprises storing a backup of the plurality of partition sets and the index at a second datacenter that is geographically separate from the first datacenter.

3. The method of claim 2, further comprising:
receiving an additional query for data that is in an additional partition of the plurality of partition sets;
determining that the additional partition is non-functional at the first datacenter; and
responsive to determining that the additional partition is non-functional at the first datacenter, routing queries for the additional partition to the backup of the additional partition at the second datacenter while continuing to service queries for data in other partitions at the first datacenter, the other partitions being the plurality of partition sets excluding the additional partition.

4. The method of claim 2, further comprising:
receiving updates to data stored in the plurality of partition sets; and
storing the updates to the data stored in the plurality of partition sets in a relational database.

5. The method of claim 4, further comprising:
receiving an additional query for data in an additional partition of the plurality of partition sets;
determining that the additional partition is non-functional at the first datacenter and at the second datacenter; and
responsive to determining that the additional partition is non-functional at the first datacenter and at the second datacenter, routing queries for the additional partition to the relational database while continuing to service queries for data in other partitions in the first datacenter or the second datacenter, the other partitions being the plurality of partition sets excluding the additional partition.

6. The method of claim 1, wherein:
the network service is a network site; and
the data associated with the single particular user that is generated using the network service is generated in response to the single particular user publishing one or more listings to the network site.

7. The method of claim 1, wherein:
the network service is a network site; and
the data associated with the single particular user that is generated on the network service is generated in response to the single particular user interacting with one or more listings published to the network site by one or more other users.

8. The method of claim 1, wherein the address includes at least one character copied from the user identifier.

9. The method of claim 1, wherein the search engine is an inverted index based search engine.

10. The method of claim 2, wherein the first datacenter and the second datacenter are each a distributed search cluster.

11. A system comprising:
one or more processors of a machine; and
a memory storing instructions that, when executed by the one or more processors, cause the machine to perform operations comprising:
indexing a plurality of partition sets in an index of a search engine, each partition set corresponding to only a single particular user of a plurality of users of a network service, each partition in a particular partition set of the single particular user corresponding to sequential periods of time in which data associated with the single particular user was generated using the network service;
receiving, from a client device, a query for a portion of the data, the query comprising a user identifier to identify the single particular user and one or more time parameters indicative of at least one sequential period of time of the sequential periods of time;
generating an address for at least one partition by concatenating the user identifier and the at least one sequential period of time, the at least one partition corresponding to the single particular user and the at least one sequential period of time;
retrieving the portion of the data from the at least one partition that matches the generated address, the portion of the data including the data associated with the single particular user generated during the at least one sequential period of time; and
providing the retrieved portion of the data to the client device.

12. The system of claim 11, wherein:
the plurality of partition sets and the index are stored at a first datacenter; and
the operations further comprise storing a backup of the plurality of partition sets and the index at a second datacenter that is geographically separate from the first datacenter.

13. The system of claim 12, the operations further comprising:
receiving an additional query for data that is in an additional partition of the plurality of partition sets;
determining that the additional partition is non-functional at the first datacenter; and responsive to determining that the additional partition is non-functional at the first datacenter, routing queries for the additional partition to the backup of the additional partition at the second datacenter while continuing to service queries for data in other partitions at the first datacenter, the other partitions being the plurality of partition sets excluding the additional partition.

14. The system of claim 12, the operations further comprising:
receiving updates to data stored in the plurality of partition sets; and
storing the updates to the data stored in the plurality of partition sets in a relational database.

15. The system of claim 14, the operations further comprising:
receiving an additional query for data in an additional partition of the plurality of partition sets;
determining that the additional partition is non-functional at the first datacenter and at the second datacenter; and
responsive to determining that the additional partition is non-functional at the first datacenter and at the second datacenter, routing queries for the additional partition to the relational database while continuing to service queries for data in other partitions in the first datacenter or the second datacenter, the other partitions being the plurality of partition sets excluding the additional partition.

16. A non-transitory machine-readable storage device embodying instructions that, when executed by one or more processors of a machine, cause the machine to perform operations comprising:
indexing a plurality of partition sets in an index of a search engine, each partition set corresponding to only a single particular user of a plurality of users of a network service, each partition in a particular partition set of the single particular user corresponding to one of a plurality of periods of time in which data associated with the single particular user was generated using the network service;
receiving, from a client device, a query for a portion of the data, the query comprising a user identifier to identify the single particular user and one or more parameters indicative of at least one period of time of the plurality of periods of time;
generating an address for at least one partition by concatenating the user identifier of the single particular user and the at least one period of time;
retrieving the portion of the data from the at least one partition that matches the generated address, the portion of the data including the data associated with the single particular user generated during the at least one period of time; and
providing the retrieved portion of the data to the client device.

17. The non-transitory machine-readable storage device of claim 16, wherein:
the plurality of partition sets and the index are stored at a first datacenter; and
the operations further comprise storing a backup of the plurality of partition sets and the index at a second datacenter that is geographically separate from the first datacenter.

18. The method of claim 1, wherein the plurality of partition sets are stored in a plurality of bucket data structures that are addressable using key values as indices of the plurality of bucket data structures, and wherein items of a same key value are stored in corresponding buckets.

19. The method of claim 18, further comprising determining which of the plurality of bucket data structures can service the query and is geographically proximate to a user or network entity that generated the query.

20. The method of claim 1, wherein each of the plurality of periods of time corresponds to a month.

* * * * *